(12) United States Patent
Yang et al.

(10) Patent No.: US 8,428,575 B2
(45) Date of Patent: Apr. 23, 2013

(54) DIAL TESTING SYSTEM AND METHOD

(75) Inventors: Shengqiang Yang, Shenzhen (CN); Dongyong Zhu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 1020 days.

(21) Appl. No.: 12/419,773

(22) Filed: Apr. 7, 2009

(65) Prior Publication Data

US 2009/0190725 A1    Jul. 30, 2009

Related U.S. Application Data

(63) Continuation of application No. PCT/CN2007/071109, filed on Nov. 21, 2007.

(30) Foreign Application Priority Data

Dec. 19, 2006   (CN) .......................... 2006 1 0161757

(51) Int. Cl.
*H04W 24/00* (2009.01)
(52) U.S. Cl.
USPC .................. 455/423; 455/67.11; 455/115.1
(58) Field of Classification Search .................. 455/423, 455/115.1, 67.11, 67.14; 379/10.01
See application file for complete search history.

(56) References Cited

U.S. PATENT DOCUMENTS

| | | | |
|---|---|---|---|
| 6,567,381 B1 * | 5/2003 | Jeon et al. | 370/252 |
| 7,158,616 B2 * | 1/2007 | Yang et al. | 379/29.01 |
| 7,787,876 B1 * | 8/2010 | Fessler et al. | 455/423 |
| 2003/0054811 A1 | 3/2003 | Han et al. | |
| 2005/0271186 A1 | 12/2005 | Lichorowic et al. | |
| 2006/0281440 A1 * | 12/2006 | Minear et al. | 455/410 |
| 2007/0036278 A1 | 2/2007 | Lichorowic et al. | |

FOREIGN PATENT DOCUMENTS

| | | |
|---|---|---|
| CN | 1391412 A | 1/2003 |
| CN | 1494263 A | 5/2004 |
| CN | 2788496 Y | 6/2006 |
| CN | 1870688 A | 11/2006 |
| CN | 100466840 C | 3/2009 |
| WO | WO 2005/120037 A2 | 12/2005 |

OTHER PUBLICATIONS

Written Opinion of the International Searching Authority in corresponding PCT Application No. PCT/CN2007/071109 (Feb. 14, 2008).

International Search Report in corresponding PCT Application No. PCT/CN2007/071109 (Feb. 14, 2008).

(Continued)

*Primary Examiner* — Creighton Smith

(74) *Attorney, Agent, or Firm* — Leydig, Voit & Mayer, Ltd.

(57) ABSTRACT

A dial testing system and a dial testing method using the dial testing system are provided. The dial testing system includes a dial testing agent device adapted to perform an automatic dial testing through a network element and control an automatic dial testing result reported by the network element; and a dial testing server adapted to collect the automatic dial testing result reported by the dial testing agent device. The dial testing system and the dial testing method provided by the present invention may assure allsidedness of a dial testing, enhance the speed and quality of the dial testing operation, and save a large amount of manpower and material resources.

20 Claims, 5 Drawing Sheets

OTHER PUBLICATIONS

Wang, "Development and research on Automatic Call Testing System for CRC telephone network," Computer and Telecommunication, vol. 13, No. 5, School of Computer Science and Information Technology of Beijing Jiaotong University, Beijing, China, 2004.

"3GPP2 A.S0001-A—3GPP2 Access Network Interfaces Interoperability Specification," Nov. 30, 2000, 3rd Generation Partnership Project, Valbonne, France.

* cited by examiner

DIAL TESTING SYSTEM AND METHOD

CROSS-REFERENCE TO RELATED APPLICATIONS

This application is a continuation of International Patent Application No. PCT/CN2007/071109, filed Nov. 21, 2007, which claims priority to Chinese Patent Application No. 200610161757.4, filed Dec. 19, 2006, both of which are hereby incorporated by reference in their entirety.

FIELD OF THE INVENTION

The present invention relates to the communication technology field, and, more particularly, to a dial testing system and a dial testing method.

BACKGROUND

Generally speaking, in various wireless communication systems, for the sake of reliability, a dial testing is required for all base stations or wireless carrier frequencies after a wireless equipment is improved, upgraded, undergoes a capacity expansion, and even has its configuration data amended, so as to determine whether all carrier frequencies after improvement and upgrade run normally.

There are mainly two dial testing methods at present. One is allocating testers in each station, who are instructed to perform dial testing after upgrade operations. The other is providing vehicles by which dial testers perform dial testing along the road. The two dial testing methods are both time-consuming and cost a lot of manpower, the service capability is poor, the cost of operation and maintenance is high, and the dial testing is inadequate to cover each carrier frequency.

SUMMARY

In order to solve the aforementioned problems, embodiments of the present invention provide a dial testing system and a dial testing method, which may assure the all-sidedness of a dial testing and enhance the speed and quality of the dial testing.

The dial testing system provided in the embodiments of the present invention includes a dial testing server and a dial testing agent device. The dial testing server is adapted to control the dial testing agent device to perform an automatic dial testing, and receive an automatic dial testing result reported by the dial testing agent device. The dial testing agent device is adapted to initiate an automatic dial testing through a network element under the control of the dial testing server, collect service information reported by the network element, and report the collected service information to the dial testing server as an automatic dial testing result.

The dial testing method provided in the embodiments of the present invention includes the following steps: the dial testing server issues an automatic dial testing start command and automatic dial testing monitoring condition to the dial testing agent device; the dial testing agent device initiates an automatic dial testing through a network element and reports the automatic dial testing result to the dial testing server; and the dial testing server receives and saves the automatic dial testing result reported by the dial testing agent device.

The dial testing system and method provided in the embodiments of the present invention employ the dial testing server and the dial testing agent device to perform an automatic dial testing by making full use of mobile terminals of current mobile subscribers in a network, thus enhancing the speed and quality of the dial testing operation. Therefore, a large amount of manpower and material resources for an engineering test are saved, allsidedness of dial testing is assured, and the speed and quality of dial testing operation are thus greatly enhanced.

BRIEF DESCRIPTION OF THE DRAWINGS

The present invention will become more fully understood from the detailed description given herein below for illustration only, and, thus, are not limitative to the present invention, and in which.

DETAILED DESCRIPTION

The specific embodiments of the present invention will be described in detail by reference to the accompanied drawings.

Figure 1:
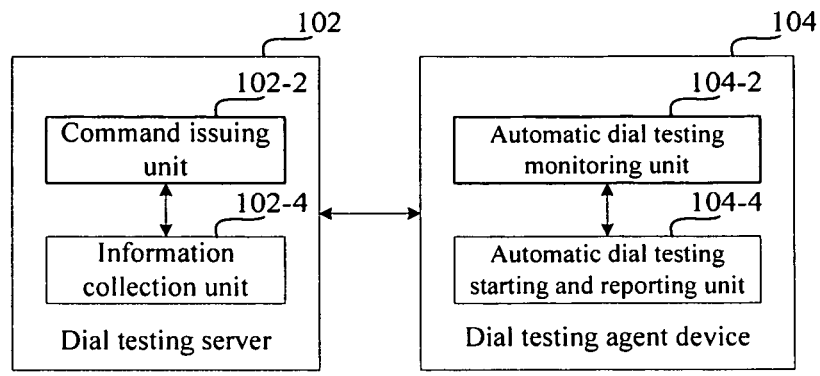
FIG. 1 is a block diagram of a dial testing system, according to an embodiment of the present invention.

FIG. 1 shows a structure of a dial testing system, according to an embodiment of the present invention. As shown in FIG. 1, the dial testing system provided in the embodiment of the present invention includes a dial testing server 102 and a dial testing agent device 104.

The dial testing server 102 is adapted to control the dial testing agent device 104 to perform an automatic dial testing, and collect an automatic dial testing result reported by the dial testing agent device 104.

The dial testing agent device 104 is adapted to initiate the automatic dial testing through a network element under the control of the dial testing server 102 or voluntarily, collect service information, and report the collected service information to the dial testing server 102 as the automatic dial testing result.

The dial testing system in the embodiment is connected to the network element in an external system through the dial testing agent device 104. The network element may be one or more of a base station transceiver (BTS), a base station controller (BSC), a mobile switching center (MSC), and a packet data serving node (PDSN). The dial testing agent device 104 may be deployed inside or outside the network element. It should be noted that, multiple dial testing agent devices 104 are allowed to be disposed in the external system in different network elements, thereby realizing automatic dial testing in different scopes.

As shown in FIG. 1, the dial testing server 102 includes a command issuing unit 102-2 and an information collection unit 102-4. The command issuing unit 102-2 includes a module adapted to issue an automatic dial testing start command and an automatic dial testing monitoring condition to the dial testing agent device 104 when the automatic dial testing needs to be performed, and a module adapted to issue an automatic dial testing stop command to the dial testing agent device 104 when the automatic dial testing needs to be stopped. The information collection unit 102-4 includes a module adapted to collect and store an automatic dial testing result reported by the dial testing agent device 104.

In the embodiment, the automatic dial testing monitoring condition at least includes a task number and a dial testing scope. The task number is adapted to identify a task performed in this automatic dial testing. The dial testing scope is adapted to identify a scope of carrier frequencies to undergo the dial testing in this automatic dial testing, which is associated with the network element for deploying the dial testing agent device and may be, for example, any carrier frequency, all carrier frequencies under any base station, all carrier frequencies under any BSC, all carrier frequencies under any MSC or all carrier frequencies under any PDSN.

The dial testing agent device 104 includes an automatic dial testing monitoring unit 104-2 and an automatic dial testing starting and reporting unit 104-4. The automatic dial testing monitoring unit 104-2 includes a module adapted to receive the automatic dial testing start command and the automatic dial testing monitoring condition from the dial testing server 102; a module adapted to initiate an automatic dial testing monitoring notification to the network element, according to the automatic dial testing monitoring condition; a module adapted to determine whether to perform the automatic dial testing, according to the service information reported by the network element; and a module adapted to receive the automatic dial testing stop command form the dial testing server 102 and notify the network element to stop the automatic dial testing. The automatic dial testing starting and reporting unit 104-4 includes a module adapted to perform the automatic dial testing through the network element under the circumstance that the automatic dial testing monitoring unit 104-2 determines that the automatic dial testing needs to be performed; and a module adapted to collect the service information reported by the network element, and report the collected service information to the dial testing server 102 as the automatic dial testing result.

In order to limit the time of performing the automatic dial testing and avoid performing the automatic dial testing timelessly, the dial testing agent device 104 may further include a monitoring timeout timer adapted to control the time of the automatic dial testing. The automatic dial testing monitoring unit 104-2 further includes a module adapted to start the monitoring timeout timer after receiving the automatic dial testing start command and notify the network element to stop the automatic dial testing when the monitoring timer times out. In this way, even if the automatic dial testing monitoring unit 104-2 does not receive the automatic dial testing stop command from the dial testing server 102 yet when the monitoring timer times out, the automatic dial testing monitoring unit 104-2 also notifies the network element to stop the automatic dial testing. If the received automatic dial testing monitoring condition carries a monitoring time, the automatic dial testing agent device 104 further includes a module adapted to set a duration of the monitoring timeout timer, according to the monitoring time.

Figure 2A:
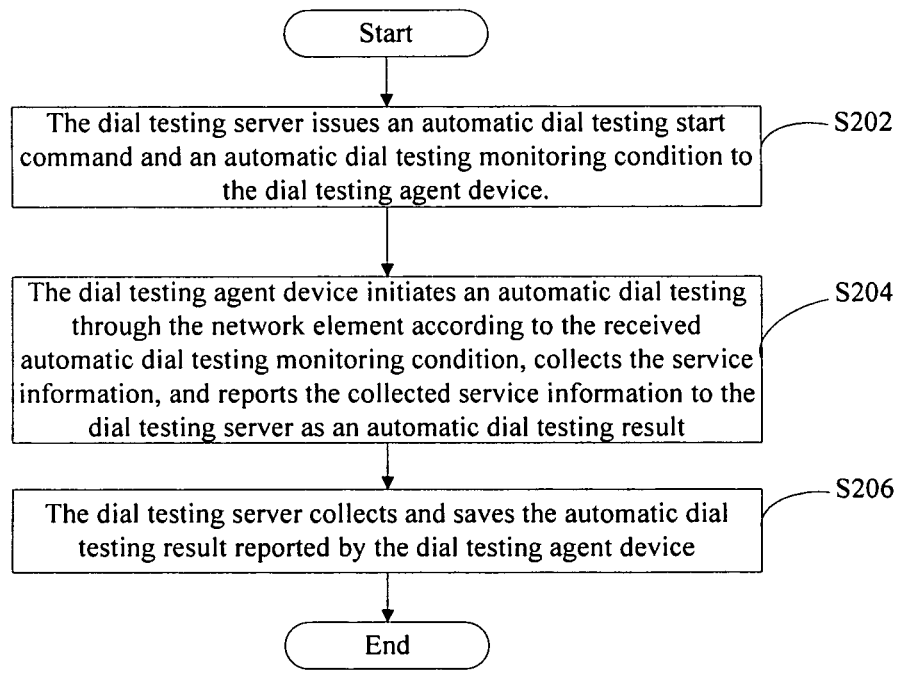
FIGS. 2A and 2B are flow charts of processes of a dial testing method, according to an embodiment of the present invention.

FIG. 2A is a flow chart of processes of a dial testing method, according to an embodiment of the present invention. As shown in FIG. 2A, the dial testing method in the embodiment includes the following steps.

In Step S202, the dial testing server issues an automatic dial testing start command and an automatic dial testing monitoring condition to the dial testing agent device.

In Step S204, the dial testing agent device initiates an automatic dial testing through the network element, according to the received automatic dial testing monitoring condition, collects the service information, and reports the collected service information to the dial testing server as an automatic dial testing result.

In Step S206, the dial testing server collects and saves the automatic dial testing result reported by the dial testing agent device.

Figure 2B:
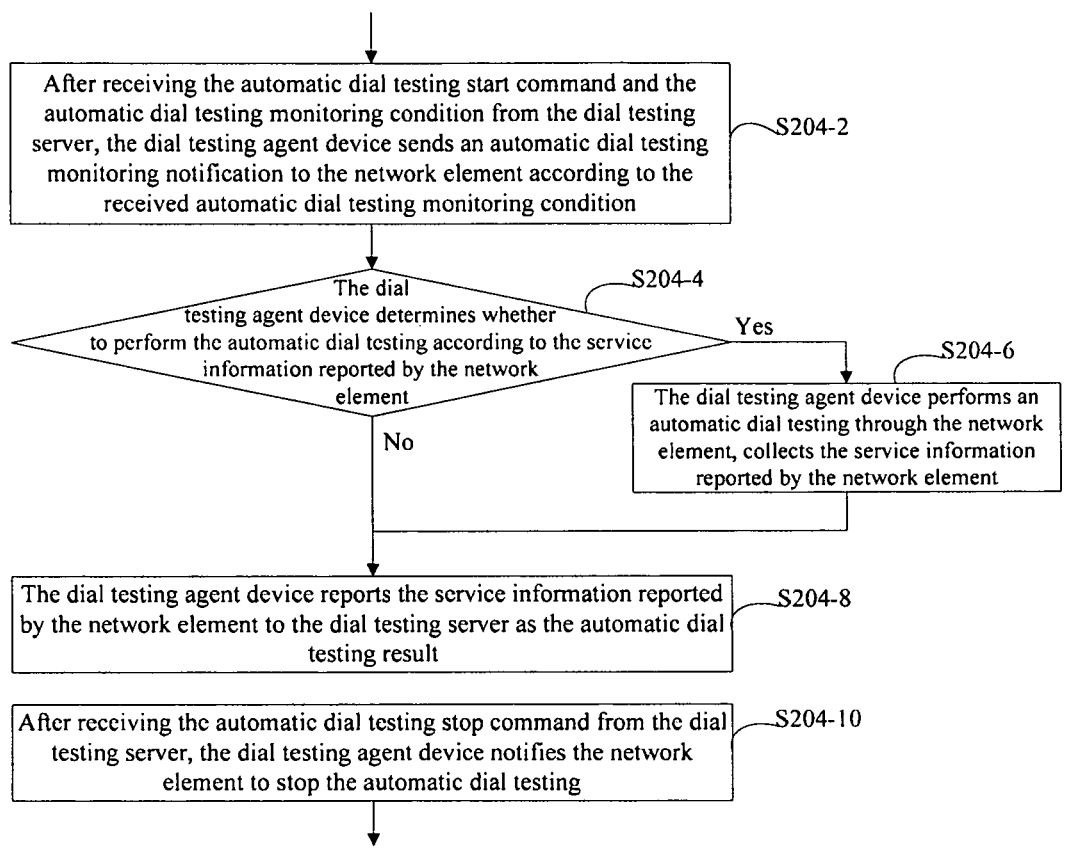

FIG. 2B shows a process of the dial testing agent device initiating the automatic dial testing through the network element, according to the received automatic dial testing monitoring condition and reporting the automatic dial testing result to the dial testing server in the Step S204. As shown in FIG. 2, the Step S204 includes the following steps.

In Step S204-2, after receiving the automatic dial testing start command and the automatic dial testing monitoring condition from the dial testing server, the dial testing agent device sends an automatic dial testing monitoring notification to the network element, according to the received automatic dial testing monitoring condition.

In Step S204-4, the dial testing agent device determines whether to perform the automatic dial testing, according to the service information reported by the network element, and if the automatic dial testing needs to be performed, the process proceeds to Step S204-6; otherwise, the process proceeds to Step S204-8.

In Step S204-6, the dial testing agent device performs the automatic dial testing through the network element, collects the service information reported by the network element, and the process proceeds to Step S204-8.

In Step S204-8, the dial testing agent device reports the service information reported by the network element to the dial testing server as the automatic dial testing result.

In Step S204-10, after receiving the automatic dial testing stop command from the dial testing server, the dial testing agent device notifies the network element to stop the automatic dial testing.

As described above, if the dial testing agent device is provided with the monitoring timeout timer, the Step S204-2 further includes starting, by the dial testing agent device, the monitoring timeout timer. Accordingly, the Step S204-10 further includes notifying, by the dial testing agent device, the network element to stop the automatic dial testing when the monitoring timeout timer times out.

If the automatic dial testing monitoring condition further carries the monitoring time, the Step S204-2 further includes setting, by the dial testing agent device, a duration of the monitoring timeout timer, according to the monitoring time in the automatic dial testing monitoring condition.

In another embodiment of the present invention, after improvement, upgrades, or capacity expansion of the network element connected to the dial testing agent device, for example, after the dial testing agent device detects that the network element connected thereto restarts after improvement, upgrades or the like, the dial testing agent device will issue an automatic dial testing task voluntarily to the network element according to a default automatic dial testing monitoring condition thereof, and performs the automatic dial testing through the network element which has restarted. In other words, the dial testing agent device performs Steps S204-2-S204-10 voluntarily, sends the automatic dial testing monitoring notification to the network element, collects the service information reported by the network element, and voluntarily reports the collected service information to the dial testing server as the dial testing result.

Particularly, in order to check whether all carrier frequencies under the restarted network element run normally, the dial testing scope of voluntarily performing the automatic dial testing may be set to cover all carrier frequencies under the network element.

In the process of the automatic dial testing in the aforementioned embodiment, the dial testing agent device does not need to wait the automatic dial testing start command issued by the dial testing server, and may voluntarily perform the automatic dial testing when the network element has been restarted, thereby not only further simplifying the flow of realizing the automatic dial testing, but also enabling the dial testing server to obtain the automatic dial testing result quickly, so that the dial testing method becomes more flexible.

CDMA2000, as a wireless access technique of the third generation mobile communication, meets criteria formulated by 3GPP2 (the Third Generation Partnership Project), has enhanced capability in supporting packet data service as compared with the second generation wireless communication technology, and is capable of supporting a circuit domain service and a packet domain service simultaneously.

Figure 3:
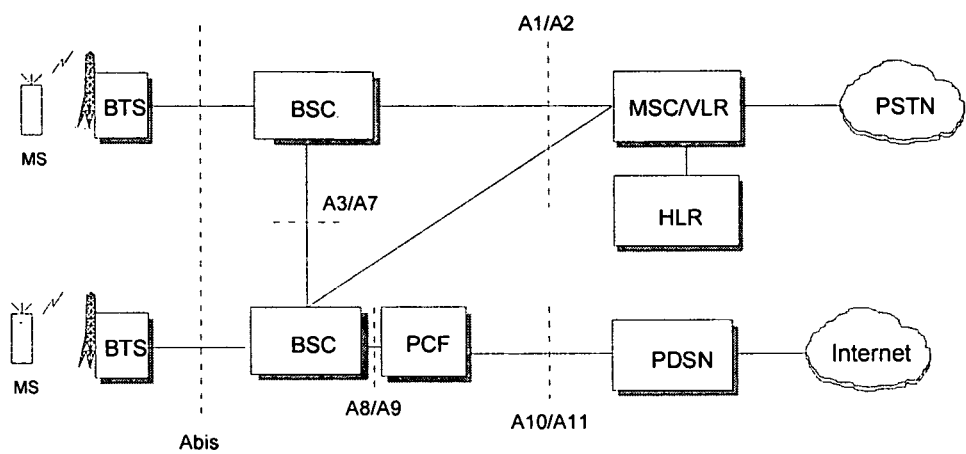
FIG. 3 is a block diagram of a CDMA network, according to an embodiment of the present invention.

The network architecture of the CDMA2000 is shown in FIG. 3. MSC/Visitor Location Register (VLR) and Home Location Register (HLR) constitute a circuit domain, which may provide the conventional circuit domain services, such as voice service. Packet Control Function (PCF) and PDSN constitute a packet domain which may provide packet data services, such as access to the Internet.

Referring to the network architecture of the CDMA2000 shown in FIG. 3, the dial testing method and system according to an embodiment of the present invention will be described in detail.

In order to add the automatic dial testing function to the CDMA2000 network, corresponding to the dial testing system in FIG. 1, two functional entities need be added to the network.

One functional entity is a dial testing agent device, also called an automatic dial testing (ADT) Agent in the embodiment, which is adapted to perform an automatic dial testing through a network element connected thereto and report a dial testing result.

As described above, the ADT Agent may be deployed inside or outside the network element connected thereto. Preferably, the ADT Agent may be deployed at a centralized signaling control point of the network element. The network element deploying the ADT Agent may be any network equipment in the CDMA2000 network, for example, BTS, BSC, MSC, or a Public Switched Telephone Network (PSTN).

The other functional entity is a dial testing server, also called an ADT server in this embodiment, which is adapted to issue the automatic dial testing start command, the automatic dial testing monitoring condition, and the automatic dial testing stop command to the ADT Agent in the network element, collect and store the dial testing monitoring result reported by the ADT Agent, and further display the automatic dial testing result at the same time.

The ADT Server may be installed in an individual computer, and also may be installed together with an Operation and Maintenance Center (OMC). For example, in FIG. 5, the ADT Server is connected with the OMC.

Figure 4:
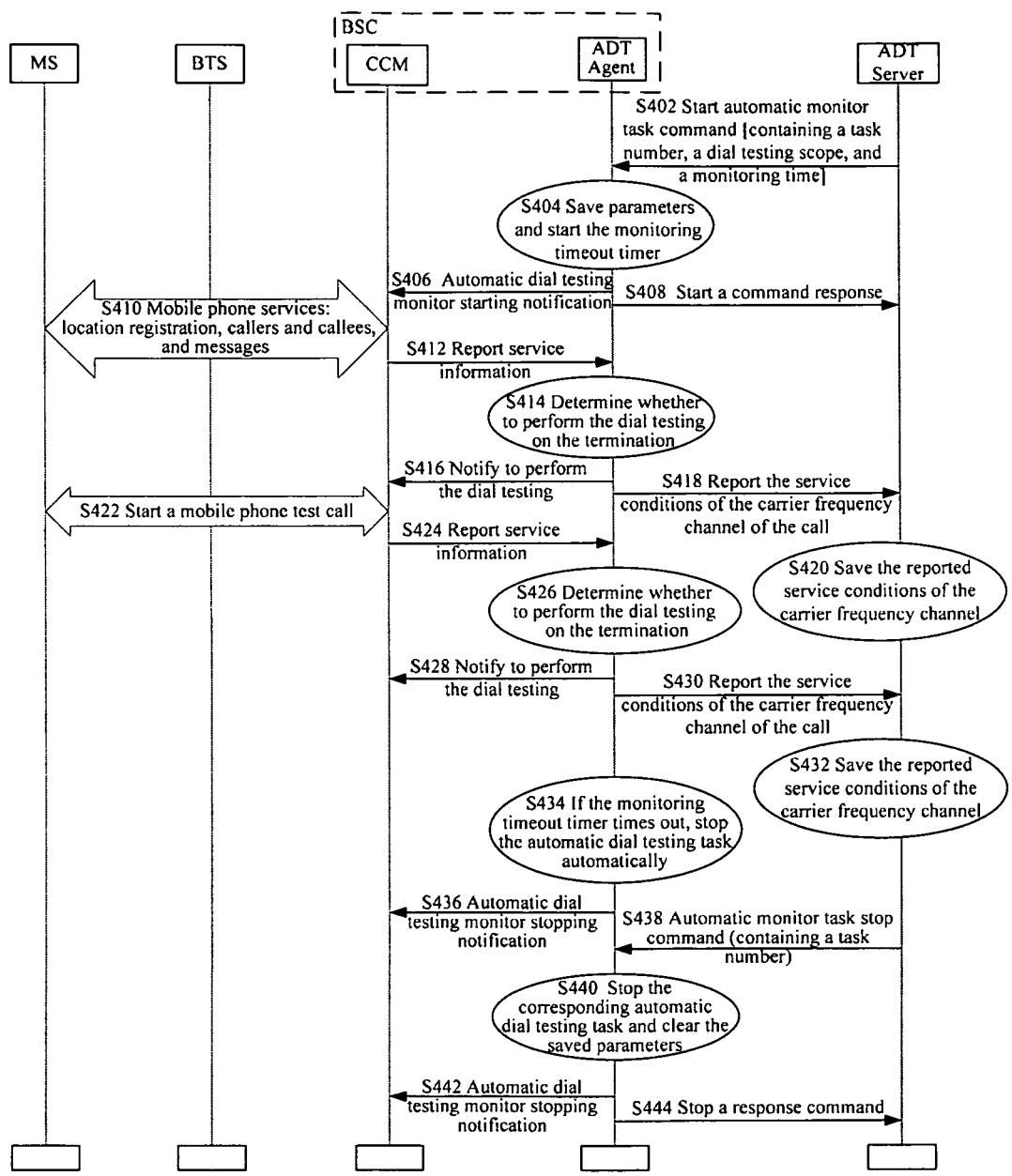
FIG. 4 is a flow chart of processes of a dial testing method, according to an embodiment of the present invention.

FIG. 4 is a flow chart of processes of realizing the dial testing method in the CDMA2000 network, according to an embodiment of the present invention. In the embodiment, the ADT Agent is deployed on the BSC. As described above, the ADT Agent may be deployed inside or outside the BSC.

As shown in FIG. 4, the dial testing method includes the following steps.

In Step S402, the ADT Server sends an automatic dial testing start command and an automatic dial testing monitoring condition containing a task number, a dial testing scope, and a monitoring time to the ADT Agent.

The dial testing scope in the automatic dial testing monitoring condition may be a carrier frequency, a base station, or a BSC. If the dial testing scope is a specific carrier frequency, it represents that the automatic dial testing monitor will be performed on the carrier frequency. If the dial testing scope is a specific base station, it represents that the automatic dial testing monitor will be performed on all carrier frequencies under the base station. If the dial testing scope is a specific BSC, it represents that the automatic dial testing monitor will be performed on all carrier frequencies under the BSC.

In Step S404, the ADT Agent, after receiving the automatic dial testing start command, saves the task number and parameters of the dial testing scope, and starts the monitoring timeout timer according to the monitoring time.

In Steps S406-S408, if the automatic dial testing monitor is started for the first time, the ADT Agent inform a Call Control Module (CCM) inside the BSC that the automatic dial testing monitor has started according to the dial testing scope, and the ADT Server feeds back an automatic dial testing response.

It should be noted that, multiple automatic dial testing monitoring tasks may be started in the system at the same time, and each task is identified by a task number.

In Steps S410-S412, the CCM inside the BSC starts monitoring various services interacting with a mobile terminal, such as location registration, callers, callees, and messages, collects service information, and determines whether the automatic dial testing monitor has restarted after these services has been performed. If the automatic dial testing monitor has restarted, the collected service information is reported to the ADT Agent.

The service information includes an International Mobile Subscriber Identity (IMSI) of the mobile terminal, an electronic serial number (ESN), access sub-zone carrier frequency information, and service conditions of carrier frequency channels. The service conditions of the carrier frequency channels may be divided in detail as shown Table 1, according to the service execution conditions.

TABLE 1

| | Service Condition of Carrier Frequency Channel | | | | |
| --- | --- | --- | --- | --- | --- |
| Service Type | Paging Channel | Access Channel | Forward Traffic Channel | Reverse Traffic Channel | Explanation |
| Location Registration | Normal | Normal | | | The location registration on an air interface is reported and issued through signaling without establishing a traffic channel |

TABLE 1-continued

| | Service Condition of Carrier Frequency Channel | | | | |
|---|---|---|---|---|---|
| Service Type | Paging Channel | Access Channel | Forward Traffic Channel | Reverse Traffic Channel | Explanation |
| Voice Caller and Callee | Normal | Normal | Normal | Normal | According to the complete conditions of channel assignment of the air interface of the flow, specifically determine whether the forward traffic channel and reverse traffic channel are normal. |
| Caller and Callee of Packet Data Service | Normal | Normal | Normal | Normal | According to the complete conditions of channel assignment of the air interface of the flow, specifically determine whether the forward traffic channel and reverse traffic channel are normal. |
| Short Message | Normal | Normal | | | A short message is reported and issued through signaling on an air interface without establishing a service channel |
| Long Message | Normal | Normal | Normal | Normal | A long message needs the establishment of a service channel, and according to the complete conditions of channel assignment of the air interface of the flow, specifically determine whether the forward traffic channel and reverse traffic channel are normal. |

In Steps S414-S420, the ADT Agent, according to the service information reported by the CMM, determines whether to perform the dial testing on the mobile terminal. More specifically, if the service conditions of the carrier frequency channel are all normal or the service information reported by the CCM is dial testing service information, there is no need to instruct the CCM to perform the dial testing. At this time, the ADT Agent sends the service conditions of the carrier frequency channel to the ADT Server as the automatic dial testing result, and then the process proceeds to Step S434. If the service conditions of the carrier frequency channel are not all normal and the service information reported by the CCM is not dial testing service information, there is a need to instruct the CCM to perform the dial testing, and then the process proceeds to Step S422.

In Step S422, the CCM, after receiving the notification, starts a mobile phone test call according to the IMSI of the mobile terminal, ESN and access sub-zone carrier frequency information carried in the notification, i.e., paging the mobile terminal by employing a test call service option in the CDMA.

The test call service includes Markov, Loopback, and TDSO, and the test call service option is a specific service option, and may simulate voice and data services to test the carrier frequency channel between the mobile terminal and the base station.

In Step S424, after the mobile phone test call has been performed, the CCM determines whether the automatic dial testing monitor has started. If the automatic dial testing monitor has started, the service information of the mobile phone test call is reported to the ADT Agent.

As described above, the service information includes the IMSI of the mobile terminal, the ESN, the access sub-zone carrier frequency information and the service conditions of the carrier frequency channel. The service conditions of the carrier frequency channel may be divided in detail as shown in Table 1 according to the service execution conditions.

In Steps S426-S432, the ADT Agent determines whether to continue the dial testing on the mobile terminal. If the service conditions of the carrier frequency channel are all normal or the reported services are dial testing services, there is no need to instruct the CCM to perform the dial testing, and the service conditions of the carrier frequency channel are sent to the ADT Server as an automatic dial testing result, and the process proceeds to Step S434. If the service conditions of the carrier frequency channel are not all normal and the reported services are not dial testing services, there is a need to instruct the CCM to perform the dial testing.

At this time, the CCM finishes the dial testing on the mobile terminal with the same flow as Steps S414-S420.

In Steps S434-S436, if the monitoring timeout timer times out, the ADT Agent stops the automatic dial testing task automatically. If finding that the system has no automatic dial testing task, the ADT Agent sends an automatic dial testing monitor stopping notification to the CCM.

In Steps S438-S444, as alternative steps of Steps S434-S436, the ADT Server may issue an automatic dial testing stop command to the ADT Agent and the automatic dial testing stop command carries a task number.

After receiving the automatic dial testing stop command, the ADT Agent stops the corresponding task. If finding that the system has no other automatic dial testing tasks, the ADT Agent sends an automatic dial testing monitor stopping notification and feeds back a response message to the ADT Server.

In a common CDMA2000 system, end users are set to register periodically. Thus, if only the automatic dial testing monitoring time is set to have a duration slightly longer than the duration for end users' periodical registration, it can be assured that, in such monitoring time, the system may finish the automatic dial testing on all carrier frequencies.

After the automatic dial testing has ended, through analysis and reference on the records of service conditions of the carrier frequency channel saved on the ADT Server, a summary of the service conditions of each carrier frequency may be displayed clearly, so that subscribers may sufficiently understand the service conditions of all sector carrier frequencies after the system equipments have been improved and upgraded. Table 2 shows an exemplary summary of the service conditions of each carrier frequency.

TABLE 2

| Sector Carrier Frequency | Service Conditions of Carrier Frequency Channel | | | |
|---|---|---|---|---|
| | Paging Channel | Access Channel | Forward Traffic Channel | Reverse Traffic Channel |
| Sector Carrier Frequency 1 | Normal | Normal | | |
| Sector Carrier Frequency 2 | Normal | Normal | Normal | Normal |
| Sector Carrier Frequency 3 | Normal | Normal | Normal | Normal |
| Sector Carrier Frequency 4 | | | | |
| Sector Carrier Frequency 5 | Normal | Normal | Normal | Normal |

According to Table 2, if the service conditions of the carrier frequency channel of a sector carrier frequency are not all normal, the sector carrier frequency is problematic, such as Sector Carrier Frequency 1 and Sector Carrier Frequency 4. Thus, subscribers may find all problematic sector carrier frequencies immediately and then solve the problems purposefully.

Figure 5:
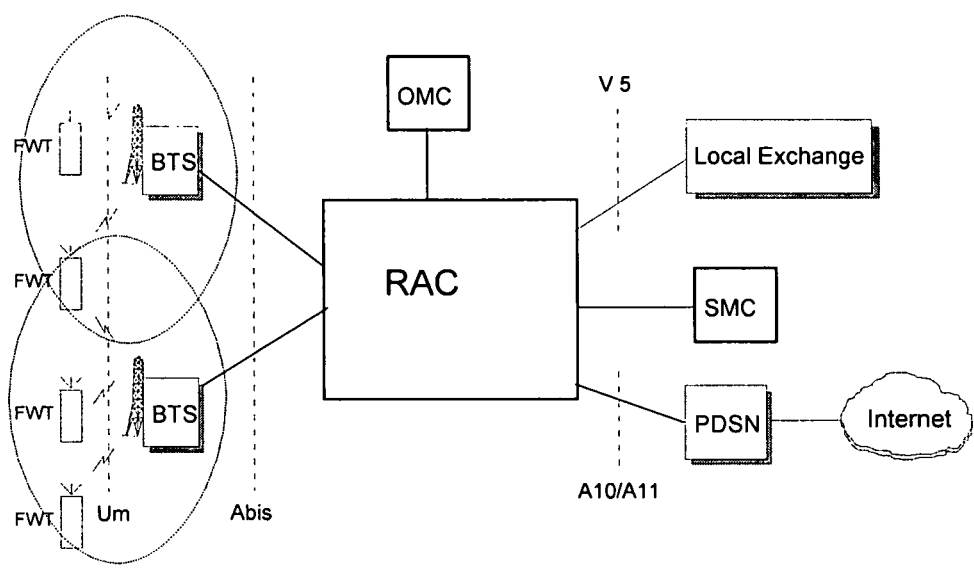
FIG. 5 is a schematic view of a wireless local loop network of CDMA2000, according to an embodiment of the present invention.

FIG. 5 is a schematic view of a wireless local loop network of the CDMA2000 according to an embodiment of the present invention. The CDMA2000-based wireless local loop network may perform the automatic dial testing on a radio access controller (RAC), the automatic dial testing monitor server may be deployed on the OMC, and the automatic dial testing monitor agent entity may be deployed on the RAC. A call session control function module in the RAC may realize the same function as the call session control function in BSC shown in FIG. 3, and the automatic dial testing flow is substantially the same as the automatic dial testing flow shown in FIG. 4.

The present invention also applies to GSM and WCDMA networks, and the automatic dial testing function may also be added on the BSC and MSC.

The automatic dial testing solution provided by the present invention makes full use of mobile terminals of current mobile subscribers in a network to perform the automatic dial testing, saves a large amount of manpower and material resources for a project, and assures the all-sidedness of the dial testing, thereby enhancing the speed and quality of the dial testing operation as a whole.

Furthermore, the automatic dial testing solution provided by the present invention may assign a specific carrier frequency, a specific base station or a specific BSC on which the automatic dial testing is performed, thereby maximally enhancing the flexibility of the dial testing.

Though the exemplary implementations of the present invention have been described above, they are not intended to limit the present invention. Any modification, equivalent alternation, and improvement made within the spirit and principle of the present invention fall within the scope of the present invention.

What is claimed is:

1. A dial testing system, comprising:
   a dial testing agent device adapted to perform automatic dial testing through a network element, and control an automatic dial testing result reported by the network element; and
   a dial testing server adapted to collect the automatic dial testing result reported by the dial testing agent device and issue an automatic dial testing stop command to the dial testing agent device.

2. The dial testing system according to claim 1, wherein the dial testing server comprises:
   a command issuing unit adapted to issue an automatic dial testing start command and an automatic dial testing monitoring condition to the dial testing agent device, and further issue the automatic dial testing stop command to the dial testing agent device; and
   an information collection unit adapted to collect and store the automatic dial testing result reported by the dial testing agent device.

3. The dial testing system according to claim 2, wherein the command issuing unit comprises:
   a module adapted to issue the automatic dial testing start command and the automatic dial testing monitoring condition to the dial testing agent device; and
   a module adapted to issue the automatic dial testing stop command to the dial testing agent device.

4. The dial testing system according to claim 1, wherein the dial testing agent device comprises:
   an automatic dial testing monitoring unit adapted to initiate an automatic dial testing monitoring notification to the network element, according to one of an automatic dial testing monitoring condition from the dial testing server and a default automatic dial testing monitoring condition of the automatic dial testing monitoring unit itself, and determine whether to perform the automatic dial testing according to service information reported by the network element; and
   an automatic dial testing starting and reporting unit adapted to perform the automatic dial testing through the network element, collect the service information reported by the network element, and report the service information to the dial testing server as the automatic dial testing result.

5. The dial testing system according to claim 4, wherein the automatic dial testing monitoring unit comprises:
   a module adapted to initiate the automatic dial testing monitoring notification to the network element, according to one of an automatic dial testing monitoring condition from the dial testing server and a default automatic dial testing monitoring condition of the module itself;
   a module adapted to determine whether to perform the automatic dial testing, according to the service information reported by the network element;
   a module adapted to receive the automatic dial testing stop command from the dial testing server; and
   a module adapted to notify the network element to stop the automatic dial testing.

6. The dial testing system according to claim 4, wherein the dial testing agent device further comprises a monitoring timeout timer adapted to control a time of the automatic dial testing; and
   the automatic dial testing monitoring unit further comprises a module adapted to start the monitoring timeout timer, and notify the network element to stop the automatic dial testing when the monitoring timeout timer expires.

7. The dial testing system according to claim 6, wherein the automatic dial testing monitoring unit further comprises a module adapted to set a duration of the monitoring timeout timer, according to the automatic dial testing monitoring condition.

8. The dial testing system according to claim 1, wherein the network element comprises at least one of a base station transceiver, a base station controller, a mobile switch, and a packet data serving node.

9. A dial testing method, comprising:
  initiating, by a dial testing agent device, automatic dial testing through a network element, and reporting an automatic dial testing result to a dial testing server;
  collecting, by the dial testing server, the automatic dial testing result reported by the dial testing agent device; and
  issuing, by the dial testing server, an automatic dial testing stop command to the dial testing agent device.

10. The dial testing method according to claim 9, wherein before initiating, by the dial testing agent device, automatic dial testing through a network element, the method further comprises:
  issuing, by the dial testing server, an automatic dial testing start command and an automatic dial testing monitoring condition to the dial testing agent device; and
  wherein initiating, by a dial testing agent device, automatic dial testing through a network element comprises:
  initiating, by the dial testing agent device, the automatic dial testing through the network element, according to the received automatic dial testing monitoring condition.

11. The dial testing method according to claim 9, wherein initiating, by the dial testing agent device, automatic dial testing through a network element comprises:
  initiating the automatic dial testing according to an default automatic dial testing monitoring condition in the dial testing agent device, after the network element restarts.

12. The dial testing method according to claim 9, wherein initiating, by the dial testing agent device, the automatic dial testing through the network element comprises:
  initiating an automatic dial testing monitoring notification to the network element, according to an automatic dial testing monitoring condition;
  determining whether to perform the automatic dial testing, according to service information reported by the network element; and
  performing the automatic dial testing through the network element, collecting the service information reported by the network element, and using the service information as the automatic dial testing result.

13. The dial testing method according to claim 9, wherein initiating, by the dial testing agent device, the automatic dial testing through the network element comprises:
  starting a monitoring timeout timer; and
  notifying the network element to stop the automatic dial testing when the monitoring timeout timer expires.

14. The dial testing method according to claim 13, wherein initiating, by the dial testing agent device, the automatic dial testing through the network element further comprises:
  setting a duration of the monitoring timeout timer according to a dial testing time in an automatic dial testing monitoring condition.

15. The dial testing method according to claim 10, further comprising:
  notifying, by the dial testing agent device, the network element to stop the automatic dial testing.

16. The dial testing method according to claim 10, wherein the automatic dial testing monitoring condition comprises at least one of a task number, a dial testing scope, and a monitoring time.

17. The dial testing system according to claim 4, wherein the determining whether to perform the automatic dial testing according to service information reported by the network element further comprises:
  when service conditions of carrier frequency channel are all normal or the service information reported by the network element is dial testing service information, there is no need to instruct the network element to perform the automatic dial testing, and the dial testing agent device sends the service conditions of the carrier frequency channel to the dial testing server as the automatic dial testing result; or
  when the service conditions of the carrier frequency channel are not all normal and the service information reported by the network element is not the dial testing service information, instructing the network element to perform the automatic dial testing.

18. The dial testing system according to claim 17, wherein the service information includes an International Mobile Subscriber Identity of a mobile terminal, an electronic serial number, access sub-zone carrier frequency information, and service conditions of the carrier frequency channel.

19. The dial testing system according to claim 8, wherein the dial testing agent device is deployed inside the network element.

20. The dial testing method according to claim 16, wherein the dial testing scope is a carrier frequency, a base station, or a base station controller (BSC), and when the dial testing scope is the carrier frequency, the automatic dial testing is performed on the carrier frequency, when the dial testing scope is the base station, the automatic dial testing is performed on all carrier frequencies under the base station, and when the dial testing scope is the BSC, the automatic dial testing is performed on all carrier frequencies under the BSC.

* * * * *